(12) United States Patent
Soto et al.

(10) Patent No.: US 8,575,257 B2
(45) Date of Patent: Nov. 5, 2013

(54) FIRE RETARDANT BROMINATED RUBBER POLYMERIC COMPOSITION AND METHOD FOR MAKING

(75) Inventors: Jorge Soto, Baton Rouge, LA (US); Jay Reimers, Baytown, TX (US); Deepak Rasiklal Parikh, Beaumont, TX (US)

(73) Assignee: Lion Copolymer, LLC, Baton Rouge, LA (US)

(*) Notice: Subject to any disclaimer, the term of this patent is extended or adjusted under 35 U.S.C. 154(b) by 0 days.

(21) Appl. No.: 13/525,228

(22) Filed: Jun. 15, 2012

(65) Prior Publication Data

US 2012/0319062 A1 Dec. 20, 2012

Related U.S. Application Data

(60) Provisional application No. 61/497,329, filed on Jun. 15, 2011.

(51) Int. Cl.
*C08K 5/02* (2006.01)
*C09K 21/00* (2006.01)
*C08C 19/12* (2006.01)

(52) U.S. Cl.
USPC ............ 524/469; 252/601; 524/468; 525/355

(58) Field of Classification Search
USPC .......................................... 524/572; 525/355
See application file for complete search history.

(56) References Cited

U.S. PATENT DOCUMENTS

| | | | |
|---|---|---|---|
| 2,384,543 A | 9/1945 | Fryling | |
| 3,524,826 A * | 8/1970 | O'Farrell et al. | 525/211 |
| 3,896,095 A * | 7/1975 | Morrissey | 525/358 |
| 4,076,769 A | 2/1978 | Watts | |
| 4,104,323 A | 8/1978 | Hansen | |
| 4,213,888 A | 7/1980 | Karg et al. | |
| 4,797,160 A * | 1/1989 | Salyer | 106/660 |
| 5,093,407 A | 3/1992 | Komai et al. | |
| 5,304,591 A | 4/1994 | Nowakowsky et al. | |
| 5,504,168 A | 4/1996 | Maestri et al. | |
| 5,763,388 A | 6/1998 | Lightsey et al. | |
| 5,985,953 A | 11/1999 | Lightsey et al. | |
| 6,197,384 B1 | 3/2001 | Schubert et al. | |
| 6,346,579 B1 | 2/2002 | Zanzig et al. | |
| 6,403,693 B2 | 6/2002 | Materne et al. | |
| 6,579,929 B1 | 6/2003 | Cole et al. | |
| 6,635,700 B2 | 10/2003 | Cruse et al. | |
| 6,921,785 B2 | 7/2005 | Campbell et al. | |
| 7,335,807 B2 | 2/2008 | Hochgesang | |
| 7,585,914 B2 | 9/2009 | Tsou et al. | |
| 7,795,365 B2 * | 9/2010 | Karjala et al. | 526/348 |
| 2004/0071626 A1 | 4/2004 | Smith et al. | |
| 2005/0256267 A1 | 11/2005 | Hochgesang | |
| 2006/0100320 A1 | 5/2006 | Dalphond et al. | |
| 2007/0106024 A1 | 5/2007 | Tsou et al. | |
| 2007/0260005 A1 | 11/2007 | Karato et al. | |
| 2008/0221274 A1 | 9/2008 | Jourdain | |
| 2008/0293889 A1 | 11/2008 | Obrecht | |
| 2009/0124730 A1 | 5/2009 | Matsuda et al. | |
| 2009/0137716 A1 | 5/2009 | Furukawa et al. | |
| 2010/0022684 A1 | 1/2010 | Wallen et al. | |
| 2011/0165356 A1 | 7/2011 | Harris et al. | |
| 2011/0166262 A1 | 7/2011 | Harris et al. | |
| 2011/0166263 A1 | 7/2011 | Rikhoff et al. | |
| 2011/0166265 A1 | 7/2011 | Harris et al. | |

FOREIGN PATENT DOCUMENTS

| | | |
|---|---|---|
| CA | 1242832 | 10/1988 |
| CA | 2724798 | 1/2010 |
| JP | 11100476 A * | 4/1999 |
| JP | 2005-33019 | 12/2005 |

OTHER PUBLICATIONS

JP 11100476 A (1999), machine translation, JPO Advanced Industrial Property Network (AIPN).*

* cited by examiner

*Primary Examiner* — David W Wu
*Assistant Examiner* — Josephine Chang
(74) *Attorney, Agent, or Firm* — Buskop Law Group, PC; Wendy Buskop

(57) ABSTRACT

A flame retardant brominated rubber polymeric composition, wherein the composition can include ethylene propylene ethylidene norbornene rubber polymer and from 12 weight percent to 55 weight percent of bromine covalently bonded thereto. The method can include dissolving a liquid ethylene propylene ethylidene norbornene rubber polymer in hexane with myrcene, forming the composition. The method can include dissolving ethylene propylene ethylidene norbornene rubber polymer in hexane, forming a solution, and adding bromine, or blending N-bromo-succinimide into the solution, forming a suspension. The method can include heating the suspension and stifling the suspension until all bromine in the N-bromo-succinimide has reacted with the ethylene propylene ethylidene norbornene rubber polymer, forming the composition as a solid in a liquid. The method can include removing the liquid from the solid, and flashing off the hexane from the liquid to extract the composition.

7 Claims, No Drawings

FIRE RETARDANT BROMINATED RUBBER POLYMERIC COMPOSITION AND METHOD FOR MAKING

CROSS REFERENCE TO RELATED APPLICATIONS

The current application claims priority and the benefit of co-pending U.S. Provisional Patent Application Ser. No. 61/497,329 filed on Jun. 15, 2011, entitled "FIRE RETARDANT BROMINATED RUBBER POLYMERIC COMPOSITION AND METHOD FOR MAKING." This reference is incorporated herein in its entirety.

FIELD

The present embodiments generally relate to a fire retardant brominated rubber polymeric composition and a method of making the same.

BACKGROUND

A need exists for a liquid flame retardant composition that is easy to apply, flows into seals, and does not require cutting as is required by solid flame retardant compositions.

A need exists for a method for making a non-chlorinated flame retardant composition that does not require the use of solvents.

A need exists for a flame retardant composition usable in the electronics industry for cell phones, fuel cells as batteries, and in school rooms.

The present embodiments meet these needs.

DETAILED DESCRIPTION OF THE EMBODIMENTS

Before explaining the present composition and method in detail, it is to be understood that the composition and method are not limited to the particular embodiments and that the embodiments can be practiced or carried out in various ways.

The present embodiments relate to a flame retardant brominated rubber polymeric composition and a method of making.

The flame retardant brominated rubber polymeric composition can be a non-chlorinated flame retardant composition.

The flame retardant brominated rubber polymeric composition can be a liquid flame retardant composition, which can be easier to apply to objects. For example, the liquid flame retardant can be applied without requiring any cutting, as is required by solid flame retardant compositions.

The liquid flame retardant can be applied by spraying, brushing, or otherwise applying the liquid flame retardant onto an object.

The liquid flame retardant brominated rubber polymeric composition can flow into cracks, seals, and other small spaces; thereby forming a more comprehensive and complete protection against flame than is achievable with solid flame retardants.

One or more embodiments of the flame retardant brominated rubber polymeric composition can be made without requiring the use of solvents.

The flame retardant brominated rubber polymeric composition can be used in the electronics industry for cell phones and fuel cells as batteries, as well as in areas where non-toxic compositions are desired, such as school rooms or hospitals.

The flame retardant brominated rubber polymeric composition can also be used to make an insulating foam, mattress, fabric, or seat cushion.

The flame retardant brominated rubber polymeric composition can include ethylene propylene ethylidene norbornene rubber polymer, also referred to as Trilene 77® available from Lion Copolymer, LLC of Baton Rouge, La.

The ethylene propylene ethylidene norbornene rubber polymer can have a number average molecular weight ranging from about 500 Daltons to about 20,000 Daltons.

The ethylene propylene ethylidene norbornene rubber polymer can have a glass transition temperature ranging from $-60$ degrees Celsius to 25 degrees Celsius. The ethylene propylene ethylidene norbornene rubber polymer can be in liquid form.

One or more embodiments of the flame retardant brominated rubber polymeric composition can have ethylene propylene ethylidene norbornene rubber polymer in an amount ranging from about 0.1 weight percent to about 75 weight percent.

The flame retardant brominated rubber polymeric composition can include from about 10 weight percent to about 75 weight percent of bromine covalently bonded to the ethylene propylene ethylidene norbornene rubber polymer.

The bromine can be covalently bonded to the ethylidene norbornene, propylene, or combinations thereof within the ethylene propylene ethylidene norbornene rubber polymer.

One or more embodiments of the flame retardant brominated rubber polymeric composition can have 56 weight percent of the ethylene propylene ethylidene norbornene rubber polymer, and 44 weight percent of 1,2-dibromo-4-(1,2-dibromoethyl)-cyclohexane, which is brominated vinylcyclohexene.

One or more embodiments of the flame retardant brominated rubber polymeric composition can include tetrabromovinylcyclohexane, with from about 0.1 weight percent to about 75 weight percent of the ethylene propylene ethylidene norbornene rubber polymer.

The flame retardant brominated rubber polymeric composition can include a solid filler material, such as aluminum trihydrate, magnesium hydroxide, talc, carbon fiber, carbon powder, metallic particulate, ceramic particulate, or combinations thereof.

One or more embodiments relate to a method for making the flame retardant brominated rubber polymeric composition.

The method can include dissolving ethylene propylene ethylidene norbornene rubber polymer in liquid form in hexane with myrcene; thereby forming the flame retardant brominated rubber polymeric composition.

The flame retardant brominated rubber polymeric composition can be rubbery and have a bromine content ranging from about 10 weight percent to about 75 weight percent, which can be covalently bonded to the ethylene propylene ethylidene norbornene rubber polymer.

Another embodiment of the method for making the flame retardant brominated rubber polymeric composition can include dissolving from about 10 weight percent to about 20 weight percent of the ethylene propylene ethylidene norbornene rubber polymer in the hexane; thereby forming a solution.

From about 5 weight percent to about 20 weight percent of N-bromo-succinimide can be blended into the solution; thereby forming a suspension.

The suspension can be heated to a temperature ranging from about 50 degrees Celsius to about 65 degrees Celsius. For example, the suspension can be heated using steam or electrical conduction.

The temperature can be maintained from about 50 degrees Celsius to about 65 degrees Celsius while stirring the heated suspension until all or substantially all of the bromine in the N-bromo-succinimide has reacted with the ethylene propylene ethylidene norbornene rubber polymer and covalently bonded thereto; thereby forming the flame retardant brominated rubber polymeric composition.

The heated suspension can be stirred without shearing in order to keep the N-bromo-succinimide moving within the liquid of the heated suspension. In one or more embodiments, the heated suspension can be stirred for about 3 hours.

When the bromine covalently bonds to the ethylene propylene ethylidene norbornene rubber polymer, a flame retardant brominated rubber polymeric composition can be formed within the liquid of the heated suspension.

The remaining liquid of the heated suspension can include the hexane.

One or more embodiments of the method can include allowing the flame retardant brominated rubber polymeric composition and the liquid of the remainder of the heated suspension to cool.

The method can include removing the liquid of the remainder of the heated suspension from the flame retardant brominated rubber polymeric composition. For example, the remaining liquid of the heated suspension can be decanted from the flame retardant brominated rubber polymeric composition, or the flame retardant brominated rubber polymeric composition can be filtered from the remaining liquid of the heated suspension, such as by using a cellulose, glass frit, coarse glass frit, medium glass frit, or glass microfiber.

The method can include flashing off the hexane from the liquid of the remainder of the heated suspension to extract the flame retardant brominated rubber polymeric composition. For example, a vacuum can be applied to the reaction vessel in which the flame retardant brominated rubber polymeric composition is formed until the flame retardant brominated rubber polymeric composition has less than 1 weight percent of hexane.

Example 1

Method for Making a Flame Retardant Brominated Rubber Polymeric Composition First, 100 grams (g) of a liquid ethylene propylene ethylidene norbornene rubber polymer can be dissolved in 500 g of hexane with 20 g of myrcene. In one or more embodiments, solid filler materials can be added to the solution.

The dissolution can be performed in a reaction vessel at a temperature ranging from about 20 degrees Celsius to about 60 degrees Celsius.

Bromine ether can be added as a pure component or as a solution to cause bromination of the liquid ethylene propylene ethylidene norbornene rubber polymer.

The reaction temperature can be maintained below 30 degrees Celsius by slowly adding the bromine ether, externally cooling the reaction vessel, or combinations thereof.

The formed flame retardant brominated rubber polymeric composition can have a covalently bonded bromine content ranging from 10 weight percent to 55 weight percent.

Example 2

Method for Making a Flame Retardant Brominated Rubber Polymeric Composition First, 100 grams (g) of ethylene propylene ethylidene norbornene rubber polymer can be dissolved in 500 g of hexane, forming a solution. In one or more embodiments, solid filler materials can be added to the solution.

The dissolution can be performed in a reaction vessel at a temperature ranging from about 20 degrees Celsius to about 60 degrees Celsius.

Next, from 5 weight percent to 20 weight percent of N-bromo-succinimide can be blended into the solution; thereby forming a suspension.

The blending can be performed in the reaction vessel at a temperature below 30 degrees Celsius.

Next, the suspension can be heated using to a temperature ranging from 50 degrees Celsius to 65 degrees Celsius.

Next, the temperature can be maintained from 50 degrees Celsius to 65 degrees Celsius while stifling the heated suspension.

The heated suspension can be stirred until all or substantially all bromine in the N-bromo-succinimide has reacted with the ethylene propylene ethylidene norbornene rubber polymer to covalently bond the bromine to the ethylene propylene ethylidene norbornene rubber polymer; thereby forming the flame retardant brominated rubber polymeric composition within the remaining liquid of the heated suspension.

Next, the remaining liquid of the heated suspension can be removed from the flame retardant brominated rubber polymeric composition, or the flame retardant brominated rubber polymeric composition can be removed from the remaining liquid of the heated suspension.

The hexane can be flashed of from the remaining liquid of the heated suspension to extract the flame retardant brominated rubber polymeric composition.

Example 3

Method for Making a Flame Retardant Brominated Rubber Polymeric Composition A liquid ethylene propylene ethylidene norbornene rubber polymer can be dissolved in a solvent with a polyunsaturated hydrocarbon.

The solvent with the polyunsaturated hydrocarbon can be myrcene, vinylcyclohexene, vegetable oil, cyclooctatetraene, or cyclododecatetraene.

In embodiments having vinylcyclohexene as the polyunsaturated hydrocarbon in the solvent, the method can include brominating the vinylcyclohexene in-situ with the ethylene propylene ethylidene norbornene rubber polymer.

Bromine can be added into the liquid ethylene propylene ethylidene norbornene rubber polymer in the solvent with the polyunsaturated hydrocarbon.

The bromine can be allowed to covalently bond to the liquid ethylene propylene ethylidene norbornene rubber polymer, forming the flame retardant brominated rubber polymeric composition.

The proportion of bromine added to the ethylene propylene ethylidene norbornene rubber polymer can be such that the formed flame retardant brominated rubber polymeric composition has a bromine content ranging from 10 weight percent to 55 weight percent covalently bonded to the ethylene propylene ethylidene norbornene rubber polymer.

In one or more embodiments, a solid filler material can be added into the solvent or into the flame retardant brominated rubber polymeric composition.

Example 4

Composition With Tetrabromo-Vinylcyclohexane

Vinylcyclohexene can be added to the liquid ethylene propylene ethylidene norbornene rubber polymer in the solvent with the polyunsaturated hydrocarbon of Example 3.

Bromination can be performed, as described in Example 3.

The ethylene propylene ethylidene norbornene rubber polymer can be present in an amount ranging from 0.1 weight percent to 75 weight percent Example 5

Method for Making a Flame Retardant Brominated Rubber Polymeric Composition

From 5 weight percent to 20 weight percent of N-bromosuccinimide can be blended into a solution of ethylene propylene ethylidene norbornene rubber polymer, forming a suspension.

The suspension can be heated to a temperature ranging from 50 degrees Celsius to 65 degrees Celsius.

The temperature can be maintained from 50 degrees Celsius to 65 degrees Celsius while stifling the heated suspension until all or substantially all of the bromine in the N-bromosuccinimide has reacted with the ethylene propylene ethylidene norbornene rubber polymer; thereby forming the flame retardant brominated rubber polymeric composition.

The flame retardant brominated rubber polymeric composition can then be recovered.

The flame retardant brominated rubber polymeric composition can be applied to one or more objects.

While these embodiments have been described with emphasis on the embodiments, it should be understood that within the scope of the appended claims, the embodiments might be practiced other than as specifically described herein.

What is claimed is:

1. A flame retardant brominated rubber polymeric composition comprising:
   a. ethylene propylene ethylidene norbornene rubber polymer;
   b. from 10 weight percent to 75 weight percent of bromine covalently bonded to the ethylene propylene ethylidene norbornene rubber polymer; and
   c. tetrabromo-vinylcyclohexane, wherein the ethylene propylene ethylidene norbornene rubber polymer is present in an amount ranging from 0.1 weight percent to 75 weight percent.

2. The flame retardant brominated rubber polymeric composition of claim 1, wherein the bromine is covalently bonded to ethylidene norbornene within the ethylene propylene ethylidene norbornene rubber polymer, propylene within the ethylene propylene ethylidene norbornene rubber polymer, or combinations thereof.

3. The flame retardant brominated rubber polymeric composition of claim 1, wherein the ethylene propylene ethylidene norbornene rubber polymer is a liquid.

4. The flame retardant brominated rubber polymeric composition of claim 1, wherein the ethylene propylene ethylidene norbornene rubber polymer has a glass transition temperature ranging from −60 degrees Celsius to 25 degrees Celsius.

5. The flame retardant brominated rubber polymeric composition of claim 1, further comprising a solid filler material.

6. The flame retardant brominated rubber polymeric composition of claim 5, wherein the solid filler material is: aluminum trihydrate, magnesium hydroxide, talc, carbon fiber, carbon powder, metallic particulate, ceramic particulate, or combinations thereof.

7. The flame retardant brominated rubber polymeric composition of claim 1, wherein the ethylene propylene ethylidene norbornene rubber polymer has a number average molecular weight ranging from 500 Daltons to 20,000 Daltons.

* * * * *